United States Patent [19] [11] 4,050,715
von Allwörden [45] Sept. 27, 1977

[54] COUPLING HOOK FOR A GUIDE MEMBER OF A THREE-POINT ATTACHMENT OF A TRACTOR

[75] Inventor: Wilhelm von Allwörden, Lohmar, Germany

[73] Assignee: Jean Walterscheid GmbH, Lohmar, Germany

[21] Appl. No.: 731,019

[22] Filed: Oct. 8, 1976

[30] Foreign Application Priority Data

Oct. 8, 1975 Germany ............................ 2545040

[51] Int. Cl.² ............................................. B60D 1/10
[52] U.S. Cl. ...................................................... 280/508
[58] Field of Search ........... 280/508, 509, 504, 456 A, 280/461 A, 477

[56] References Cited

U.S. PATENT DOCUMENTS

| 3,361,447 | 1/1968 | Engelmann | 280/504 |
|---|---|---|---|
| 3,539,203 | 11/1970 | Baugh | 280/504 |
| 4,014,562 | 3/1977 | Kunze | 280/508 |

Primary Examiner—Robert R. Song
Attorney, Agent, or Firm—Edmund M. Jaskiewicz

[57] ABSTRACT

A coupling hook has a latch which is displaceable into the hook opening in its locked position to block a coupling pin received in a slot formed in a partially spherical member pivotally mounted in the opening. The latch is provided with a surface which engages a coacting surface on the partially spherical member to maintain the latch in its open position. When a coupling pin is received in the slot of the partially spherical member the member will be urged downwardly against a spring and the latch will be disengaged from the partially spherical member. A second spring then urges the latch into its locked position.

4 Claims, 3 Drawing Figures

COUPLING HOOK FOR A GUIDE MEMBER OF A THREE-POINT ATTACHMENT OF A TRACTOR

The present invention relates to a coupling hook for the upper guide member of a three-point attachment on a tractor, more particularly, to such a hook having a latch displaceable between locked and open positions.

The guide members, and particularly the upper guide members, for tractor attachments to which agricultural implements or other machines are to be connected have been provided with a wide variety of coupling hooks many of which have various forms of locking or latching structures to retain implement coupling pins therein. One form of such a coupling hook has a partially spherical member with a longitudinal slot therein mounted with a limited degree of pivotal movement within the hook opening of the coupling hook. A locking element is provided to block or bar the hook opening.

In the German patent P S No. 1246300 there is disclosed such a coupling hook which includes partially spherical members which are mounted for limited pivotal movement in spherical bearing cups formed in the coupling hooks. The partially spherical members have longitudinal slots for the radial introduction of coupling pins which are provided on the agricultural implement or machine to be connected to the tractor. The longitudinal slot is closed or barred by a spring-loaded locking element. The degree of pivoting movement of the partially spherical member is limited by threaded bolts or pins received within recesses formed in the partially spherical member. The partially spherical member is thus capable of limited universal movement but cannot be removed from its bearing cup.

Such a coupling hook structure has the disadvantage that the upper guide member must always be precisely adjusted for the required coupling distance of the implement to be coupled in order to insure that the opening of the coupling hook on the upper guide member is positioned exactly opposite to the corresponding coupling pin on the implement to be coupled. Only after this exact position has been established can the coupling hook be pushed over the coupling pin by overcoming the force of its locking spring. Subsequently, the locking member will slide over the coupling pin seated within the coupling hook. If the length adjustment of the upper guide member should be insufficient to achieve the final length correction, the tractor operator must maneuver the tractor very carefully in order to reach the correct position for engaging the coupling hook with the coupling pin. This the operator may do either by pushing the coupling hook over the coupling pin or by lifting the upper guide member and then dropping the upper guide member onto the coupling point of the implement. This coupling hook structure has the further disadvantage that the upper guide member is difficult to manipulate because of its weight and because of the distance between the operator's seat and the coupling point.

Another disadvantage is that the operator of the tractor cannot accurately observe from his seat whether or not the coupling hook is actually positioned precisely above the coupling pin.

It is therefore the principal object of the present invention to provide a novel and improved coupling hook which is particularly adapted for the upper guide member of tractor three-point hitch.

It is another object of the present invention to provide such a coupling hook which will receive in locking position a coupling pin of an implement to be coupled in such a manner that the upper guide member when placed on the upper coupling point of the implement will move automatically into the correct coupling position without any assistance or adjustment by the tractor operator.

According to one aspect of the present invention a coupling hook for a guide member of a three-point attachment of a tractor may comprise a hook member and a partially spherical member pivotally mounted within the hook opening of the hook member. The partially spherical member is provided with a slot to receive a coupling pin on an implement to be coupled. A latch is displaceable into the hook opening to block the coupling pin within the slot when the latch is in its locked position and the latch is also displaceable to an open position. The partially spherical member pivots about a fulcrum located on a portion of the hook opening opposed from the latch. A spring disposed between the hook member and the partially spherical member and spaced from the fulcrum urges the partially spherical member toward the latch. The latch is provided with means which is engageable with a portion of the partially spherical member for maintaining the latch in its open position.

This coupling hook according to the present invention has the advantage that it is no longer necessary to carefully and precisely manipulate the coupling hook over the coupling pin. Also, the coupling hook eliminates any necessity for the tractor operator to push or drop the heavy upper guide manually over the coupling pin. The coupling hook will automatically assume its final operatively locked position in the course of the coupling operation.

It is to be noted that during the coupling operation the lower coupling pins of the implement to be coupled are coupled first before the coupling of the upper coupling pin is made. The operator then positions the upper guide member with its extended coupling hook over the coupling pin of the implement and subsequently retracts the coupling hook until a face on the hook engages with the coupling pin. The operator then raises the lower guide members so as to tilt the upper portion of the implement rearwardly to enable the upper coupling pin of the implement to slide along the slide face of the coupling hook and slip into the slot of the partially spherical member seated in the hook opening.

Prior to the coupling of the coupling pin, the partially spherical member is positioned about a fulcrum in the hook and pivoted upwardly out of its spherical bearing cup so that its locking face is engaged with a corresponding face of the locking member to maintain the member in its open position. The partially spherical member will be pushed back into the bearing cup into its final operative or locked position. The movement of the partially spherical member into its locked position will cause a disengagement of the locking member which will then be displaced into the hook opening to block the coupling pin therein.

It is apparent that the result of this coupling hook structure is that the upper guide member will automatically carry out the locking operation by the action of its own weight in conjunction with the lifting movement of the lower guide members without requiring any manual effort by the tractor operator.

Other objects and advantages of the present invention will be apparent upon reference to the accompanying description when taken in conjunction with the following drawings, which are exemplary, wherein;

FIG. 1a is a longitudinal sectional view of a coupling hook according to the present invention showing the components thereof in a position ready for coupling;

FIG. 1b is a top plan view of the hook of FIG. 1a;

FIGS. 3a–c are three views of the partially spherical member seated in the hook opening of the accompanying hook of the present invention.

Proceeding next to the drawings wherein like reference symbols indicate the same parts throughout the various views a specific embodiment and modifications of the present invention will be described in detail.

Figure 1:
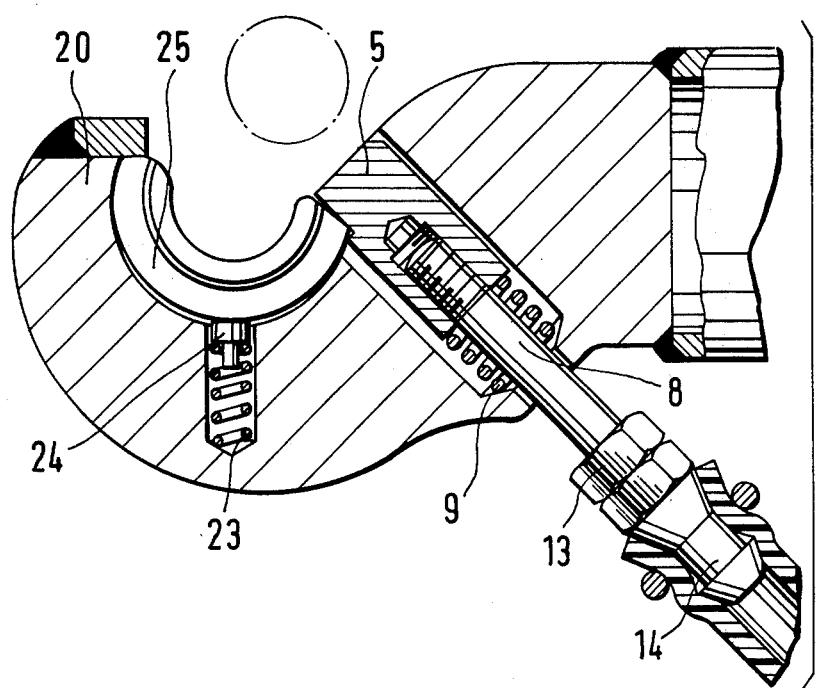
Figure 1:
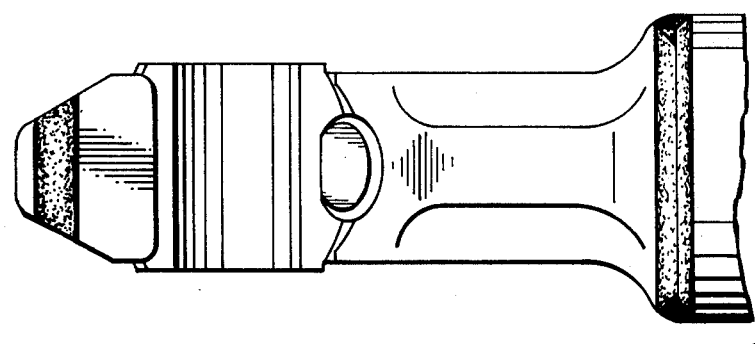
Figure 2:
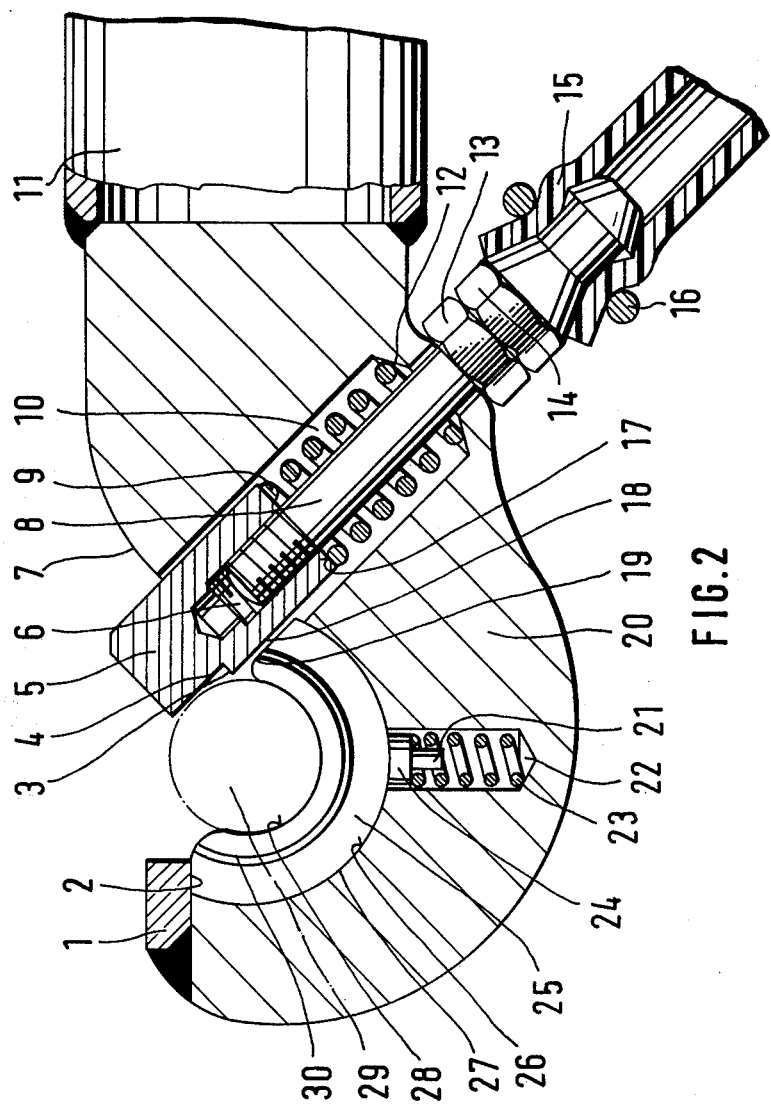
FIG. 2 is a view similar to that of FIG. 1a but showing the components of the coupling hook in the locked position.
Figure 3:
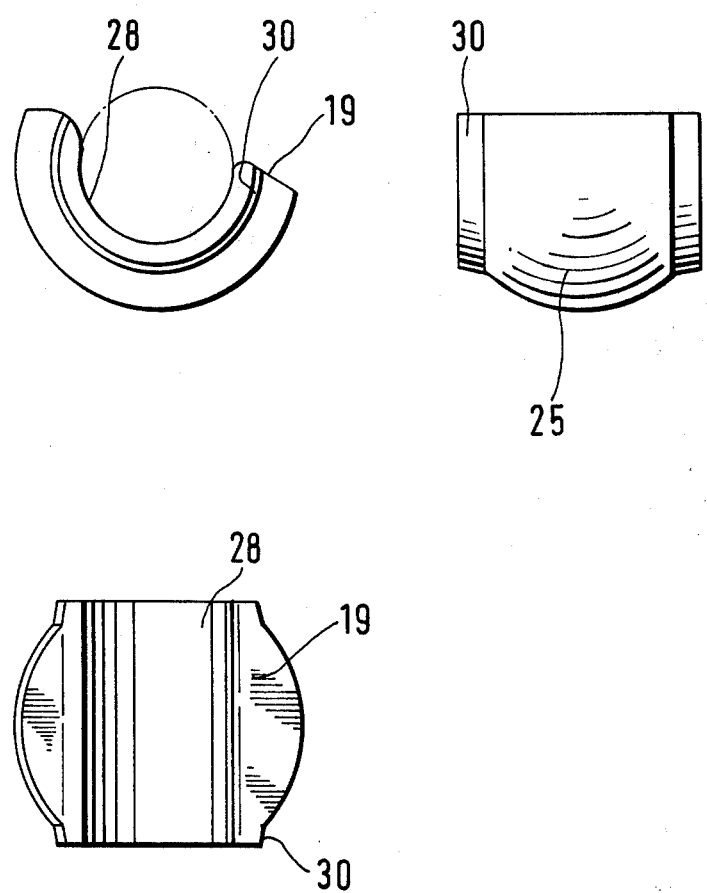

As may be seen in FIGS. 1 and 2, the coupling hook of the present invention comprises a hook member 20 having a hook opening 27 therein which is shaped as a spherical bearing cup 26 and which receives a partially spherical member 25 shown in greater detail in FIG. 3. The member 25 is open on its upwardly directed surface by means of a longitudinal slot 28 extending therethrough which receives a coupling pin 29 on the implement to be coupled to the tractor. The partially spherical member 25 is provided on both its outer faces with an edge or rim 30 which limits its pivotal movement within the hook opening.

On the end of the hook member 20 there is attached an end plate 1 which projects into the hook opening 27 so as to define a stop 2 or fulcrum contacted by an end of the partially spherical member 25 as may be seen in the drawings.

Approximately in the central positioning of the hook opening 27 there is a recess or bore 22 in which is received a spring 23 acting against a loading plate 24 having a guide pin 21. The plate 24 bears against the underside of the member 25 so as to pivot the member 25 about its fulcrum 2.

The end of the member 25 opposite from the stop 2 is machined so as to form an inclined surface 19 for engagement with a locking member 5.

The locking member 5 is in the form of a latch bolt which is displaceable within the bore or passageway 10 opening into the hook opening 27 opposite from the fulcrum 2. The latch bolt 5 has a threaded bore 6 to receive a tension screw 8 which is surrounded by a spring 9. The spring 9 acts between a face 17 formed on one end of the latch bolt 5 and a countersurface 12 formed within the bore 10. The screw 8 extends outwardly of the hook member and has nuts 13 and 14 threaded thereon. A hollow gripping handle 15 which may be of a resilient material is positioned over a contoured end of the tension screw 8 and secured in position by means of a clamping ring 16.

The bolt 5 is provided with an operative locking surface 18 which is engageable with the surface 19 on the partially spherical member 25. The end of the bolt 5 is provided with a locking surface 4 and a notch 3 which functions as an abutment or engaging surface.

The upper side of the coupling hook as viewed in FIG. 2 is provided with a slide face 7 along which the coupling pin 29 may slide during the coupling operation.

The coupling hook member 20 is connected to the upper guide member 11 by welding such as shown in the drawings.

In order to couple an agricultural implement or machine having a corresponding three-point linkage to the three-point attachment of the tractor, the operator first drives the tractor in the reverse direction toward the machine and couples the two lower coupling pins with the corresponding coupling hooks on the lower guide members. The operator then extends the upper guide member 11 to its fully extended position and positions the guide member 11 such that the hook opening 27 of the coupling hook 20 is located over the upper coupling pin 29 of the machine. At the same time, the operator retracts or shortens the upper guide member 11 such that the slide face 7 of the coupling hook 20 rests on the coupling pin 29. The operator then raises the lower guide member so as to slowly raise the machine being coupled. As the upper portion of the machine will tilt rearwardly, this tilting movement will cause the coupling pin 29 to slide along the face 7 into the slot 28 of the partially spherical member 25 seated in the coupling hook 20.

The rims 30 on the member 25 will permit lateral pivoting of the member 25 within the bearing cup 26 to a limited extent which corresponds to the prevailing operational requirements.

The continued lifting of the implement being coupled by hydraulic power will force the coupling pin 29 firmly into the slot 28 of the partially spherical member 25. As a result, the spring 23 will be compressed and the partially spherical member 25 will be fully seated in the spherical bearing seat 26.

At the same time, the end face 19 of the member 25 which was engaged with the surfaces 3 and 4 of the latch 5 to maintain the latch in its open position will be disengaged from the latch. This disengagement results from the pivoting of the partially spherical member 25 around its fulcrum located at the stop 2 of the end plate 1. Upon disengagement of the surface 19 from the latch bolt 5, the spring 9 will push the bolt 5 into the locking or extended position as shown in FIG. 2 so that the bolt 5 is positioned over the coupling pin 29. The pin 29 is thus locked within the hook opening 27 of the coupling hook.

It is apparent that this coupling operation can be carried out without the necessity of the tractor operator manually manipulating the heavy upper guide member into the coupling position by maneuvering the tractor and simultaneously operating the hydraulic lift from his seat. The coupling hook as described above thus considerably facilitates the coupling operation and requires the expenditure of less energy.

It is to be further noted that the upper guide member automatically carried out the locking operation by the action of its own weight in conjunction with the lifting movement of the lower guide members.

In order to disengage or uncouple the implement from the tractor, the operator without leaving his seat pulls the handle 15 such that the bolt 5 is moved into the bore 10 against the action of the spring 9. This movement is away from the coupling pin 29 and the hook oepning 27 such that the bolt 5 moves into its opened position.

Raising the upper guide member 11 at this point will cause the partially spherical member 25 to release the coupling pin 29. The spring 23 will thus pivot the member 25 upwardly about its fulcrum 2 such that its stop face 19 engages with the stop face 4 and forwardly of the notch or shoulder 3 on the bolt 5. The upper guide member 11 is now in its inoperative or rest position and the handle 15 may be released. The coupling hook 20 is now in position for the next coupling operation. The operator then disengages the lower coupling pins of the machine from the tractor attachment and unlocks the lower coupling hooks. The implement is now uncoupled or disengaged from the tractor.

It is apparent that one advantage of this coupling hook is that the spring 23 and its associated plate 24 tilts the partially spherical member 25 upwardly so as to arrest and maintain the locking member 5 in its retracted or open position. The upper guide member is now located in position for subsequent automatic engagement and locking with the corresponding coupling pin.

Thus it can be seen that the present invention has disclosed a coupling hook which is simple in construction, effective and reliable in operation, and provides for automatic locking of the coupling pin during the coupling operation without any assistance or adjustment by the tractor operator.

It will be understood that this invention is susceptible to modification in order to adapt it to different usages and conditions, and accordingly, it is desired to comprehend such modifications within this invention as may fall within the scope of appended claims.

What is claimed is:

1. A coupling hook for a guide member of a three-point attachment of a tractor comprising a hook member having a hook opening, a partially spherical member having a slot to receive a coupling pin on an implement to be coupled and pivotally mounted within said hook opening, a latch displaceable into said hook opening to block a coupling pin in said partially spherical member slot in the locked position and displaceable into an open position, means on a portion of said hook opening opposed from said latch for defining a fulcrum for said partially spherical member, a first spring between said hook member and said partially spherical member and spaced from said fulcrum means urging said partially spherical member towards said latch, and means on said latch engageable with a portion of said partially spherical member for maintaining said latch in its open position.

2. A coupling hook as claimed in claim 1 wherein said means on said latch comprises a notched surface.

3. A coupling hook as claimed in claim 1 and further comprising a second spring urging said latch into its locked position when a coupling pin is received in said partially spherical member slot to disengage said partially spherical member portion from said open position maintaining means on said latch.

4. A coupling hook as claimed in claim 1 wherein there is a recess in said hook member, said recess opening into said hook opening and said first spring positioned in said recess.

* * * * *